United States Patent [19]

Van der Velden

[11] 4,438,055

[45] Mar. 20, 1984

[54] METHOD OF MAKING A CERAMIC ARTICLE AND ARTICLES MADE BY THE METHOD

[75] Inventor: Jan H. Van der Velden, Apeldoorn, Netherlands

[73] Assignees: Esmil, B.V., Netherlands; Hoeke Engineering, N.V., Belgium

[21] Appl. No.: 291,429

[22] Filed: Aug. 10, 1981

Related U.S. Application Data

[63] Continuation of Ser. No. 84,131, Oct. 12, 1979, abandoned, which is a continuation of Ser. No. 916,009, Jun. 16, 1979, abandoned.

[30] Foreign Application Priority Data

Jun. 21, 1977 [NL] Netherlands .......................... 7706797

[51] Int. Cl.$^3$ ............................................... B29J 1/00
[52] U.S. Cl. ......................................... 264/44; 264/63
[58] Field of Search ..................................... 264/44, 63

[56] References Cited

U.S. PATENT DOCUMENTS

| 2,242,434 | 5/1941 | Norton | 264/63 |
| 3,297,801 | 1/1967 | Konrad | 264/44 |
| 3,591,393 | 7/1971 | Rankine | 264/44 |

FOREIGN PATENT DOCUMENTS

| 2014951 | 10/1971 | Fed. Rep. of Germany . |
| 2337261 | 2/1975 | Fed. Rep. of Germany . |
| 2400037 | 7/1975 | Fed. Rep. of Germany . |
| 2508476 | 9/1976 | Fed. Rep. of Germany . |
| 2543944 | 5/1977 | Fed. Rep. of Germany . |
| 2549118 | 5/1977 | Fed. Rep. of Germany . |
| 1509712 | 12/1967 | France . |
| 6701636 | 8/1967 | Netherlands . |

*Primary Examiner*—John A. Parrish
*Attorney, Agent, or Firm*—Stevens, Davis, Miller & Mosher

[57] ABSTRACT

A ceramic article is made by shaping, drying and firing a body shaped from a mixture of clay and an organic fraction. The organic fraction is derived from domestic waste by separation of metal parts, coarse material and material in sheet form. The proportion of clay in the mixture is 40 to 65% by weight and the clay contains more than 10% by weight of particles of size greater than $2\mu$.

7 Claims, No Drawings

METHOD OF MAKING A CERAMIC ARTICLE AND ARTICLES MADE BY THE METHOD

This is a continuation of application Ser. No. 84,131 filed Oct. 12, 1979 now abandoned which in turn is a continuation of application Ser. No. 916,009 filed June 16, 1978 now abandoned.

BACKGROUND OF THE INVENTION

1. Field of the Invention

This invention relates to a method of making a ceramic article from a mixture containing clay and organic material. The invention also relates to ceramic articles e.g. bricks, made by this method.

2. Description of the Prior Art

In the manufacture of ceramic building materials, it is known to add organic residues such as straw to clay. The reason for this may for example be to improve the deformation properties of the clay mixture or to give it a certain desired porosity. However in the production of ceramic elements for the building industry by modern production methods, the addition of organic matter has as a result of certain disadvantages only found acceptance on a very limited scale.

It should be mentioned that ceramic elements in which sawdust is mixed as organic matter into the clay are known. Since the rise of the chipboard industry, however, the price of sawdust has risen considerably, making the production of bricks made of clay/sawdust mixtures very expensive. Additionally a very specially selected kind of clay is required for mixture with sawdust, which restricts the applicability of this known method.

It is also known to use expanded plastics material as an organic additive in a ceramic material. This too is a relatively expensive process, and the products lack strength.

SUMMARY OF THE INVENTION

It is an object of the invention to provide a method of making ceramic articles, e.g. building bricks, using clay and organic material.

It is a further object to provide such a method which makes use of a waste material and which can provide cheap products and bring about improved properties in building bricks while retaining the good properties of conventional bricks.

It is yet another object to provide a method of making ceramic articles, using clay and organic material, which is applicable to a wide variety of clays.

According to the invention there is provided a method of making a ceramic article comprising the steps of preparing a mixture of (a) 40 to 65% (by weight) of clay of which more than 10% (by weight of the clay) is a fraction consisting of particles of size greater than $2\mu$ and (b) an organic fraction which is obtained from domestic waste after separation therefrom of metal parts, coarse material and material in sheet form, shaping said mixture into a body, and drying and firing the shaped body.

In the method of the invention no sawdust need be used as organic material. The method can be applied to a great variety of clays, and makes it possible to obtain lighter and stronger products than by conventional processes. The products may also have singularly attractive properties. The large variety in the feasible types of clay to be used in the invention may also lead to a large variety in the properties and the outward appearance of the finished ceramic articles.

Ceramic articles produced according to the invention can have the advantages over the known product using expanded plastics of lower cost of manufacture and higher strength. The new ceramic articles can be useful for load-bearing partition walls as well as for rain and frost-resistant outside walls.

Dutch laid-open patent application no. 74.03554 discloses a method for the removal of metal parts, sheet material and coarse organic material from domestic waste leaving a fine organic fraction suitable for use in the present invention. It has particularly appeared that the method according to the invention produces satisfactory results if the organic fraction used has the following screen analysis (% by weight):

| particle size | <4 mm | 60-75% |
|---|---|---|
| particle size | 4-6 mm | 25-35% |
| particle size | 6-10 mm | 4-10% |
| particle size | >10 mm | absent | and has a moisture content of 25 to 50 weight %, preferably 35 to 50 weight % and is generally free from glass particles of size >2 mm. The method of producing this fine organic fraction, e.g. as described in the abovementioned Dutch patent application, should be carried out so that the result is an organic fraction with the required screen analysis, while the moisture content can be adjusted later to the desired level.

The invention means that this fine organic fraction, which would otherwise have to be incinerated as waste matter or otherwise disposed of, can be used for an appropriate purpose. In addition, bricks can be obtained having a low specific weight and a high porosity. High porosity results in better thermal insulation and sound insulation properties, an improvement which is obviously connected with the increase in the porosity of the brick.

It is surprising that, after addition of the organic fraction to the clay component, further treatment of the mixture can take place without difficulties in a similar manner as for bricks made of clay only. Differences in this respect may arise in the period required for drying and firing the product, and in the quantity of fuel required for firing. It has appeared in fact that drying as well as firing may require less time, while about 50% of the fuel cost could be saved. The drying time required could also be reduced to about half. It is evident that the latter factor is of importance when setting up a new brick works, especially with regard to possible saving of investment cost.

It should, however, be borne in mind that ignition of the organic fraction in the mixture may lead to a spontaneous temperature rise which can be detrimental to the quality of the brick. In the firing of the kiln, it should therefore be ensured that the chosen temperature gradient in the kiln rises less steeply than if no organic material had been added.

Although the mixing ratio of the mixture can be changed within the limits set for the invention without real disadvantage, best results in certain applications may still be obtainable with a mixture of a particular composition.

Generally, the best results appear to be achieved with a mixture which has a moisture content of 20 to 30 weight % prior to shaping and further treatment. If a ceramic element is manufactured which must meet special requirements as to low weight and proper insulation properties, and which also is to be particularly cheap, preference is given to a mixture with 40 to 48% volume clay, wherein the clay has a moisture content of 15 to 33 weight %. However, if a brick with great strength is sought, a mixture of 52 to 65 volume % clay, is preferred with the moisture content of the clay from 25 to 30% by weight. Suitable treatment properties can in particular be achieved with a type of clay which has a moisture content of 25 to 30 weight %.

It is particularly preferred to use an organic fraction which has the following screen analysis:

| particle size | <2.8 mm | about 60% |
|---|---|---|
| particle size | 2.8–4 mm | 8 to 10% |
| particle size | 4–7 mm | 28 to 35% |
| particle size | >10 mm | absent | and has a moisture content of 37 to 47% by weight and an ash content of 20 to 40% by weight, and which is substantially free of glass particles of size >2 mm.

The invention also provides ceramic articles, particularly building bricks manufactured by the method of the invention.

Apart from the advantages already summarized regarding heat insulation and sound insulation, there is also a distinct advantage obtainable in that the new bricks may be lighter in weight. Nevertheless it is evident that the bricks obtained in this way can without difficulty meet the requirements of strength and true dimensions set for the highest application group A 1 in Dutch Standard NEN 2489. It has even appeared more particularly that products derived from the new mixture of the invention can give rise to fewer problems during drying as far as contraction is concerned. The material may contract to a lesser degree and therefore retain a larger volume, while the occurrence of objectionable deformities, contraction cracks etc. may be less frequent or totally absent. This in its turn results in less rejects in brick production and consequently a higher output and a reduction of cost price.

EXAMPLE

The invention will now be illustrated by a single non-limitative example which is a practical process on an industrial scale. It is however pointed out that the invention clearly has a wider field of application than the method described in this example.

Bricks were manufactured from a clay material which is found at Stekene in Belgium. This type of clay has a water content of 27.5% and a specific mass of 1.27. It contains more than 10% of particles with a size greater than $2\mu$ (microns). The specific surface of the component grains of this clay was measured and found to be 155 m$^2$/g. Besides aluminum silicates, this clay contained about 5% Fe$_2$O$_3$ and 2% CaO by weight. The weight loss of the dry compound on heating is 7.3%.

The other component used in the mixture to be turned into bricks was a fine organic fraction produced by a separation plant for domestic waste. Metal parts, coarse material and material in sheet or foil form had been removed in the separation process. The screen analysis of this fine organic fraction was as follows:

| particle size | <4 mm | 68% |
|---|---|---|
| particle size | 4–6 mm | 26% |
| particle size | 6–10 mm | 6% |
| particle size | >10 mm | absent |

This material was also free from glass particles measuring >2 mm, and had a moisture content of 43 weight %.

For this material, a firing value for the dry component of 10 MJ/kg was assessed. The content of foreign metals, acid residues and phosphorus proved to be so small that it may be assumed that they have no impact on the later production steps, nor can they cause any problems of an environmental nature in the further processing.

Five volume parts of the moist clay were mixed with four volume parts of the organic fraction (including the moisture added during production of the organic fraction). In terms of the dry mass in the clay and in the organic material, this amounts to a mixture of 1 kg dry clay per 0.52 kg of dry mass in the organic fraction.

In a conventional manner, the mixture was mixed in a clay kneader and treated further by techniques conventional in the brick industry. Thus, the kneaded material was finally pressed through a perforated plate provided with holes of 30 mm $\phi$ and then transported to a shaping machine by a conveyor belt. The mixture was then next pressed by an extruder into a strand of clay, from which separate blocks were cut off by means of a cutting device. The blocks extruded and cut off in this fashion measured 318×154×99 mm. The block is then provided with two rows of 9 holes each, the holes penetrating right through the block from top face to bottom face, i.e. along the 99 mm dimension. Subsequently the blocks were dried for two 24 hour periods, while the moisture content of the mass was reduced to 6%. A drying contraction of 5% occurred. Then the blocks were put into a tunnel furnace where they remained for 60 hours. The tunnel furnace was fired at a temperature of about 1000° C. During firing further contraction of 4% took place in the blocks which resulted in an overall contraction of 8.8%. The blocks obtained in this way showed an average compressive strength of 14.2 N/mm$^2$. They proved to have great uniformity in shape and to be highly satisfactory as building material in view of their thermal and sound insulation properties. Compared with bricks based only on clay, the new blocks proved to be far easier to saw and to nail.

When the quantity of fuel required for firing a block was measured, this quantity being represented by the firing value MJ, the new blocks were found to require a heat consumption for firing of only 6.0 MJ, in contrast with 11.49 MJ for a block based only on clay but otherwise with the same basic dimensions before drying. The period required for drying of the new blocks proved to be notably shorter than for the blocks only based on clay.

I claim:

1. A method of making a ceramic article comprising the steps of preparing a mixture of (a) 40 to 65% (by weight) of clay consisting essentially of aluminum silicate, Fe$_2$O$_3$ and CaO of which more than 10% (by weight of the clay) is a fraction consisting of particles of size greater than $2\mu$ and (b) an organic fraction which is obtained from household waste after separation therefrom of metal parts, coarse material and material in sheet form, said organic fraction having a screen analysis as follows (% by weight)

| particle size | <4 mm | 60-75% |
| particle size | 4-6 mm | 25-35% |
| particle size | 6-30 mm | 4-10% |
| particle size | >−10 mm | absent | and having a moisture content of 25 to 50% by weight, and being substantially free from glass particles of size greater than 2 mm, shaping said moisture into a body, and drying and firing the shaped body.

2. A method according to claim 1 wherein the moisture content of the organic fraction is 35 to 50% by weight.

3. A method according to claim 1 or 2 wherein the said mixture has, before shaping, a moisture content of 20 to 30% by weight.

4. A method according to claim 3 wherein the mixture contains 40 to 48% by volume of said clay, the moisture content of the clay being 15 to 33% by weight.

5. A method according to claim 1 or 2 wherein the mixture contains 52 to 65% by volume of said clay, the moisture content of the clay being 15 to 33% by weight.

6. A method according to claim 5 wherein the said clay has a moisture content of 25 to 30% by weight.

7. A method according to claim 1 wherein the said organic fraction has a screen analysis as follows (% by weight):

| particle size | <2.8 mm | about 60% |
| particle size | 2.8-4 mm | 8-10% |
| particle size | 4-7 mm | 28-35% |
| particle size | >10 mm | absent, | has a moisture content of 37 to 47% by weight and an ash content of 20 to 40% by weight and which is substantially free of glass particles of size >2 mm.

* * * * *